July 3, 1956
J. S. WHITE ET AL
2,752,663
METHOD OF UNITING TERMINALS AND CONDUCTIVE ELECTRODES
AND BONDING SAME TO CERAMIC BASE
Filed Jan. 4, 1952

*INVENTOR.*
J. S. WHITE
*BY* LOUIS G. KUTZER

*Harry M. Saragovitz*
*Attorney*

United States Patent Office 2,752,663

Patented July 3, 1956

2,752,663

METHOD OF UNITING TERMINALS AND CONDUCTIVE ELECTRODES AND BONDING SAME TO CERAMIC BASE

Jonathan S. White, Wilkinsburg, and Louis G. Kutzer, Latrobe, Pa., assignors to the United States of America as represented by the Secretary of the Army Application January 4, 1952, Serial No. 264,912

1 Claim. (Cl. 29—25.42)

This invention relates to the preparation of fusion bonds between ceramics and/or metals, and more particularly to the manufacture of ceramic capacitors of the high temperature resistant type.

Various silver preparations suitable for printed circuits are disclosed in brief in the United States Department of Commerce National Bureau of Standards, miscellaneous publication 192, issued November 22, 1948, entitled "New Advances in Printed Circuits" page 15 in particular. Revealed in this publication are preparations containing silver powder, binder, thinner, and a ceramic flux (a low melting, finely divided glass). These preparations are particularly suited for producing on a ceramic base material a fixed electrically conductive coating. Metal films formed from a palladium resinate sprayed upon a nonconducting base and fired to form a conductive coating are also revealed in this publication.

When using the above described fired-on coatings it has in the past sometimes been found desirable to copper plate an applied silver coating, especially if the coated assembly requires that soldered connections be made to the fired film. The copper coating serves as a protective coating and prevents injury or rupture of the connection on the applied silver conductor by the heat of the soldering operation in conjunction with the action of the solder. While some soldering of terminals directly to a silver surface printed circuit has been practiced heretofore, the possibility of injury or rupture of the connection by the heat of the soldering operation is always present when solder is applied to such silver surface.

An object of this invention is to overcome the foregoing and related disadvantages.

A further object is to provide a method for preparing a high temperature resistant, highly electrically conductive, non-oxidizable fusion bond between a ceramic, a metal and/or a metallized ceramic element.

These and other objects of the invention will become apparent from the description and claim that follow.

Figure 1:
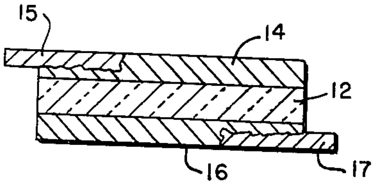
Figure 2:
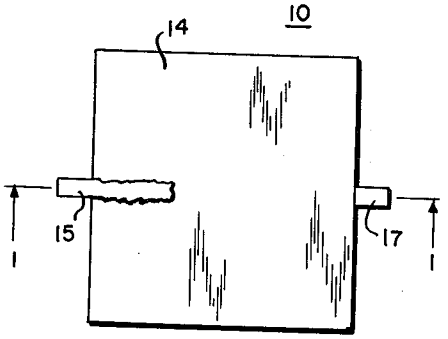
Figure 3:
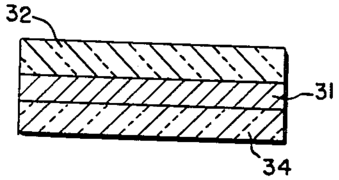

The invention will be more clearly understood by reference to the appended drawings wherein:

Fig. 1 shows a cross-sectional view on the line 1—1 of Fig. 2 of a capacitor in accordance with an embodiment of the invention, Fig. 2 is a top view of the capacitor, and Fig. 3 shows a fusion bond between two ceramic discs in accordance with another embodiment of the invention.

These drawings have not been drawn to an exact scale, but dimensions have been exaggerated where necessary to show specific details.

Like numerals refer to like parts in each of the several figures.

Referring to Figs. 1 and 2 the capacitor 10 is shown to consist of a dielectric disc or plate (circular or otherwise) 12 coated on each of its surfaces with coatings or layers 14 and 16 which form the electrodes of the capacitor 10. Terminals 15 and 17 are shown embedded in coatings 14 and 16 respectively and are secured thereto merely by the fusion bond existent between the terminals and the coatings brought about by firing the structure at a temperature sufficient to effect an intimate bond between the elements. No solder is utilized to effect the desired bond. The present invention provides a specific paste which, when treated in accordance herewith, may serve both as a conductive coating for, and as a bonding agent between the capacitor elements.

In Fig. 3 there is shown a laminated structure prepared in accordance herewith. In producing the last named article a surface of one or both of the dielectric discs 32 and 34 were coated with a paste of the composition herein disclosed and, after being pressed together with the paste interposed, the so assembled structure was fired to a temperature sufficient to effect an intimate bond between the elements, the paste being converted to a smooth surfaced highly electrically conductive and bonding member 31.

A particularly suitable paste for use with the present invention contains by weight between about 30 and 50 parts of a metallic resinate (such as a silver or platinum organo-salt) between about 20 and about 40 parts of a ceramic flux (such as a silicate or bi-silicate of an oxidizable metal such as lead) and between about 30 and about 50 parts of a powdered crystalline noble metal (such as silver, gold or platinum) together with the necessary thinners and dryers (such as oil of cloves and lead oleate).

In general, the present invention provides a method of preparing a high temperature resistant, highly electrically conductive, non-oxidizable fusion bond between a ceramic and a metal or a metallized ceramic element without the use of solders. In accordance with the method provided, an area of at least one of the elements to be fusion bonded is coated with a paste of the type defined above and the other element is embedded in, or otherwise brought into electrical surface contact with the paste coating. The resultant structure is then fired to effect an intimate bond and form a composite laminate. The time and temperature of firing may be varied in accordance with the mass and nature of the material of the laminate to be formed. Most laminates comprised within this invention as commonly practiced may be suitable bonded by firing at a temperature of from about 590° C. to about 760° C. for a period of from about 15 minutes to about 2 hours.

While the invention has been described with reference to the formation of ceramic-metal laminates it is particularly suitable for the production of stacked ceramic capacitors. The paste of the present invention has also been used successfully for attaching leads to the internal and external electrodes of tubular capacitors wherein the temperature of operation is such that the normally employed lead-tin solder is unsatisfactory. In manufacturing capacitors in accordance with this invention metallic terminals are embedded in, or otherwise brought into electrical contact with, the paste before forming and then firing the laminate or tubular structure with the terminal included. The terminals are usually composed of the metal predominating in the paste applied to the ceramic. For example a silver terminal is used with a silver paste etc.

Since the terminals of the capacitor are bonded to the electrodes without the use of solder the finished capacitor will function satisfactorily at elevated temperatures far beyond the melting point of the normally employed lead-tin solder the eutectic of which is molten at 163° C.

As may apparently widely different embodiments of the invention may be made without departing from the spirit and scope hereof, it is to be understood that the invention is not limited to its specific embodiments except as defined in the appended claim.

What is claimed is:

The method of constructing a high-temperature-resistant structurally strong capacitor, structurally capable of use and electrical functioning at temperatures well above the melting points of common lead-tin solders and composed of elements consisting of a least one ceramic dielectric plate, electrode layers and terminals bonded together; said method consisting in the steps of applying to at least one face of a ceramic dielectric plate a layer of an electrically conductive bonding agent constituting an electrode and being one of said electrode layers of said elements of the capacitor, said bonding agent containing by weight about 30 to 50 parts of a resinate of a noble metal, about 20 to 40 parts of a ceramic flux, and about 30 to 50 parts of the powdered crystalline same noble metal as in said resinate; stacking said elements with dielectric plates and electrode layers alternated, embedding terminal elements composed of the same said noble metal in at least two of said electrode layers, and firing the resultant structure at about 560° C. to about 760° C., so as to fuse each said electrode layer to each next adjacent dielectric plate and to fuse respective said electrode layers to said terminal elements embedded therein.

References Cited in the file of this patent

UNITED STATES PATENTS

| | | |
|---|---|---|
| 1,745,400 | Brennecke | Feb. 4, 1930 |
| 1,796,683 | Carlson | Mar. 17, 1931 |
| 2,395,442 | Ballard | Feb. 26, 1946 |
| 2,398,176 | Deyrup | Apr. 9, 1946 |